(12) United States Patent
Zillmer et al.

(10) Patent No.: US 8,266,819 B2
(45) Date of Patent: Sep. 18, 2012

(54) AIR DRYING SYSTEM FOR CONCENTRATED SOLAR POWER GENERATION SYSTEMS

(75) Inventors: Andrew J. Zillmer, Woodland Hills, CA (US); Daniel P. Cap, Chatsworth, CA (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 924 days.

(21) Appl. No.: 12/349,838

(22) Filed: Jan. 7, 2009

(65) Prior Publication Data
US 2010/0170500 A1 Jul. 8, 2010

(51) Int. Cl.
*F26B 21/08* (2006.01)

(52) U.S. Cl. .... 34/378; 34/78; 34/84; 34/90; 60/641.11; 126/609; 126/618; 136/246; 136/257; 165/10; 219/629; 219/632

(58) Field of Classification Search ............ 34/378, 34/380, 381, 77, 78, 80, 86, 90, 210; 60/641.11; 126/609, 618; 165/10; 219/629, 632
See application file for complete search history.

(56) References Cited

U.S. PATENT DOCUMENTS

| | | | | |
|---|---|---|---|---|
| 4,125,946 A * | 11/1978 | Prager | | 34/80 |
| 4,189,848 A * | 2/1980 | Ko et al. | | 34/473 |
| 4,307,519 A * | 12/1981 | Szucs et al. | | 34/473 |
| 4,368,583 A * | 1/1983 | Bauermeister | | 34/93 |
| 4,584,428 A | 4/1986 | Garlick | | |
| 5,606,413 A | 2/1997 | Bellus et al. | | |
| 5,640,783 A * | 6/1997 | Schumaier | | 34/219 |
| 6,112,428 A * | 9/2000 | Schaff | | 34/81 |
| 6,158,147 A * | 12/2000 | Smith et al. | | 34/474 |
| 6,557,804 B1 | 5/2003 | Carroll | | |
| 6,688,018 B2 * | 2/2004 | Soucy | | 34/68 |
| 6,701,711 B1 | 3/2004 | Litwin | | |
| 6,877,508 B2 | 4/2005 | Litwin | | |
| 6,886,339 B2 | 5/2005 | Carroll et al. | | |
| 6,931,851 B2 | 8/2005 | Litwin | | |
| 6,957,536 B2 | 10/2005 | Litwin et al. | | |
| 7,138,960 B2 | 11/2006 | Carroll et al. | | |
| 7,173,179 B2 | 2/2007 | Nicoletti et al. | | |
| 2002/0088139 A1 * | 7/2002 | Dinh | | 34/467 |
| 2005/0262720 A1 * | 12/2005 | Rane et al. | | 34/330 |
| 2007/0251569 A1 | 11/2007 | Shan et al. | | |
| 2008/0000231 A1 | 1/2008 | Litwin et al. | | |
| 2008/0271776 A1 | 11/2008 | Morgan | | |

OTHER PUBLICATIONS

Zillmer, Andrew J., Fuel Cell Instrumentation System, U.S. Appl. No. 11/744,229, filed May 4, 2007.
Litwin, Robert et al., Supercritical CO2 Turbine for Use in Solar Power Plants, U.S. Appl. No. 11/636,247, filed Dec. 8, 2006.
Carroll, Joseph P., Dual-Function Stirling Engine System, U.S. Appl. No. 11/500,117, filed Aug. 7, 2006.

* cited by examiner

*Primary Examiner* — Stephen M. Gravini
(74) *Attorney, Agent, or Firm* — Kinney & Lange, P.A.

(57) ABSTRACT

An air drying system for use in a concentrated solar power generation system using a fluid heat transfer medium includes a first vent pipe and a first desiccant pack. The first vent pipe extends from the concentrated solar power generation system and includes a first inlet open to ambient air, and a first outlet open to an interior of the solar power generation system in fluid communication with the fluid heat transfer medium. The first desiccant pack is positioned within the first vent pipe between the first inlet and first outlet and is positioned to reduce moisture content of ambient air flowing into the first vent pipe.

20 Claims, 3 Drawing Sheets

AIR DRYING SYSTEM FOR CONCENTRATED SOLAR POWER GENERATION SYSTEMS

CROSS-REFERENCE TO RELATED APPLICATION(S)

The present application is related to the following co-pending application filed on the same day as this application: "AIR INSTRUMENTATION SYSTEM FOR CONCENTRATED SOLAR POWER GENERATION SYSTEMS" by inventors A. Zillmer and J. Carroll (U.S. patent application Ser. No. 12/349,887).

BACKGROUND

The present invention relates to air conditioning systems for solar power generation systems and, more particularly, to air drying systems for concentrated solar power generation systems.

Throughout the world there is an increasing demand for energy, which is typically provided by fossil fuels such as petroleum and coal. Additionally, due to scarcity and adverse environmental effects of fossil fuels, cleaner, renewable energy sources are becoming more desirable. As technology advances, alternative fuel sources are becoming practical to replace, or at least augment, conventional power plants to meet worldwide energy demand in a clean manner. In particular, solar energy is freely available and is becoming more feasible, especially in the form of concentrated solar power, which allows for energy storage and can be scaled for commercial production.

Concentrated solar power generation systems typically comprise solar collectors that focus solar rays onto a heat transfer medium such as a molten salt. For example, solar power towers use an array of thousands of heliostats to concentrate energy on an elevated central receiver through which molten salt flows inside of numerous pipes. In solar trough systems, molten salt flows through extended lengths of piping which are shrouded by solar collecting troughs that concentrate energy along lengths of the pipes. Heat from the solar energy is transferred to the molten salt and then through a heat exchanger to another medium, such as air or water, which is then used to generate mechanical energy that is ultimately converted to electrical power. Molten salt efficiently stores heat from the solar energy for extended periods of time such that electrical power can be generated at night or during other periods of low solar collection. Concentrated solar power generation systems are, however, typically vented to the atmosphere and are, as such, open to receiving moisture and debris from the surrounding environment. There is, therefore, a need for understanding and improving air quality within solar power generation systems.

SUMMARY

The present invention is directed to an air drying system for use in a concentrated solar power generation system using a fluid heat transfer medium. The air drying system includes a first vent pipe and a first desiccant pack. The first vent pipe extends from the concentrated solar power generation system and includes a first inlet open to ambient air, and a first outlet open to an interior of the solar power generation system in fluid communication with the fluid heat transfer medium. The first desiccant pack is positioned within the first vent pipe between the first inlet and first outlet and is positioned to reduce moisture content of ambient air flowing into the first vent pipe.

DETAILED DESCRIPTION

Figure 1:
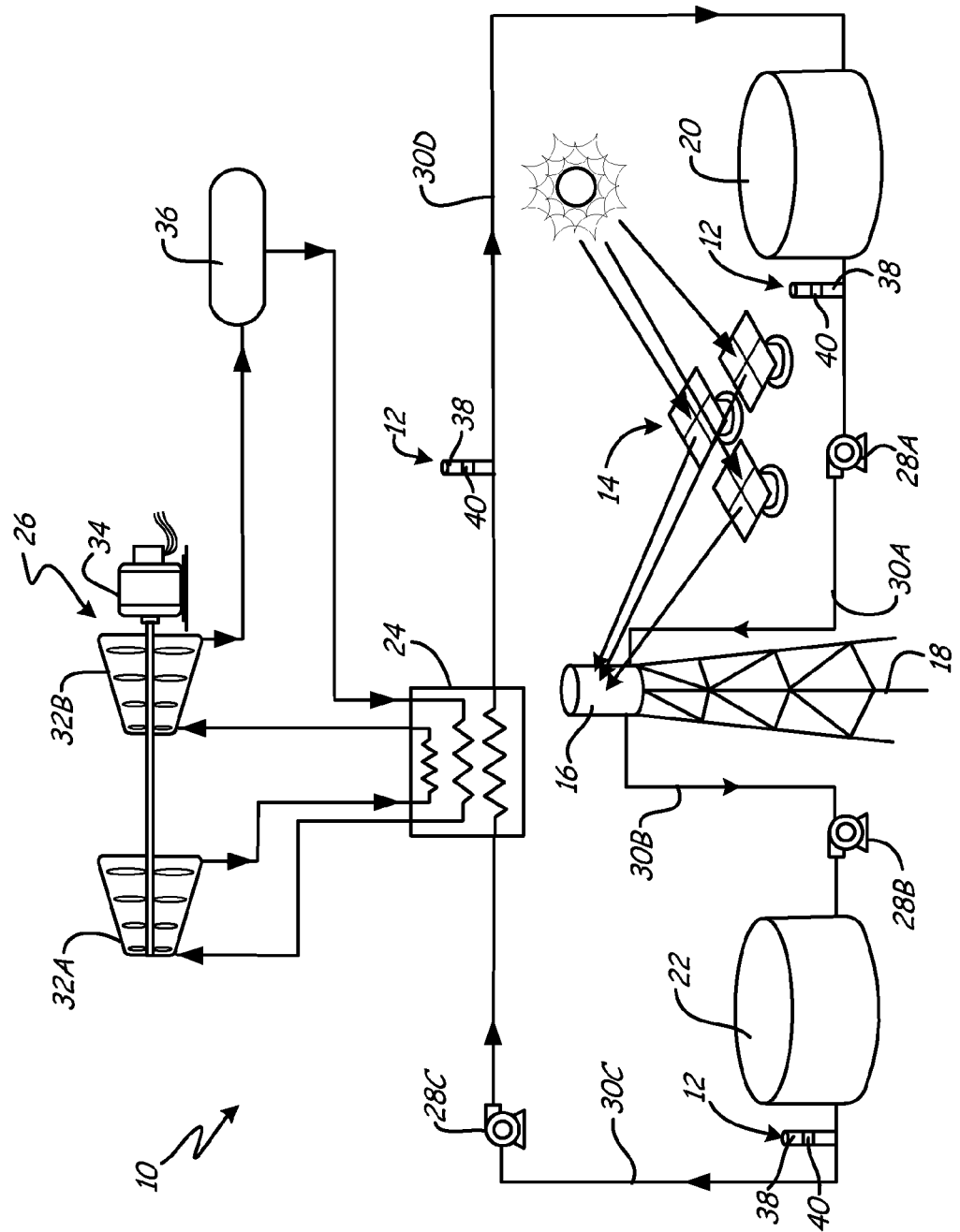
FIG. 1 shows a schematic diagram of a concentrated solar power generation system having an air drying system of the present invention.

FIG. 1 shows a schematic diagram of concentrated solar power generation system 10 having air drying systems 12 of the present invention. In the embodiment shown, system 10 comprises a power tower system having solar collector system 14, central receiver 16, tower 18, cold storage tank 20, hot storage tank 22, heat exchanger 24, generator 26, pumps 28A, 28B and 28C, and pipes 30A, 30B, 30C and 30D. In other embodiments, system 10 may comprise a beam down solar power generation system or a parabolic trough solar power generation system. Solar collector system 14 and central receiver 16 impart heat from the sun into a molten heat transfer medium contained in storage tanks 20 and 22 such that thermal energy can be converted to electrical energy using heat exchanger 24 and conversion system 26. Air drying systems 12 remove moisture from pipes 30A-30D that connect the various components of system 10 to prevent the occurrence of water-related damage in system 10.

Solar collector system 14 comprises an array of sun-tracking mirrors, or heliostats, that concentrate solar rays at central receiver 16 to heat a heat transfer medium located within pipes 30A-30D. In one embodiment, approximately 8,500 heliostats, each having a having surface area of about 42 $m^2$ (square meters) to about 150 $m^2$, are arranged concentrically around a tower, having a height of approximately 170 meters, to cover an area of approximately 1 to 2 square mile (~2.59 to ~5.18 square kilometers). The heat transfer medium typically comprises molten salt that is maintained in a molten state between approximately 500° F. (~260.0° C.) and 1200° F. (~648.9° C.) such that it remains liquid. Through pipe 30A, pump 28A directs cool heat transfer medium from cold storage tank 20 into a plurality of tubes within central receiver 16 whereby heat from the concentrated solar rays is imparted into the heat transfer medium. Through pipe 30B, pump 28B directs the heated heat transfer medium from receiver 16 to hot storage tank 22 where it is stored in a state ready for producing power with heat exchanger 24. When power is desired to be produced, heated heat transfer medium is routed through pipe 30C by pump 28C from hot storage tank 22 to heat exchanger 24 where heat is input into conversion system 26. Conversion system 26 may comprise any conventional system that converts thermal energy to mechanical energy, such as Brayton cycle or Rankine cycle systems. In the embodiment shown, conversion system 26 comprises a steam turbine generator having first stage expander 32A, second stage expander 32B, generator 34 and condenser 36. Water within heat exchanger 24 is heated by the molten heat transfer medium to produce steam that turns first and second stage expanders 32A and 32B. Expanders 32A and 32B rotate a shaft to drive generator 34 to convert mechanical energy to electrical energy. Heat exchanger 24 therefore removes heat from the heat transfer medium before the heat transfer medium is returned to cold storage tank 20 through pipe 30D. Although solar power generation system 10 is shown using three pumps to move molten salt through pipes 30A-30D, more or fewer pumps can be used. For example, in various embodiments, the height of tower 18 provides enough pressure to move the molten salt into hot storage tank 22 such that pump 28B is not needed.

The use of a heat transfer medium such as molten salt allows system 10 to efficiently store thermal energy in salt contained in hot storage tank 22 such that electrical power can be generated at times when solar collector system 14 is operating below peak. Thus, system 10 can be run 24 hours a day at low power production or at higher production levels for shorter intervals. In various embodiments, the molten salt can be salts composed of alkaline earth fluorides and alkali metal fluorides, and combinations thereof. Suitable elements of the molten salt include: Lithium (Li), Sodium (Na), Potassium (K), Rubidium (Rb), Cesium (Cs), Francium (Fr), Beryllium (Be), Magnesium (Mg), Calcium (Ca), Strontium (Sr), Barium (Ba), Radium (Ra), and Fluorine (F). Examples of suitable fluoride molten salts include, but are not limited to: FLiNaK, FLiBe, FLiNaBe, FLiKBe, and combinations thereof, as is described in greater detail in U.S. Pat. App. No. 2008/0000231 to Litwin et al. Salts, however, need to be maintained at elevated temperatures to remain in a molten state such that the salt can flow between components of system 10 using pipes 30A-30D and pumps 28A-28C. Thus, it is necessary to provide various trace heating systems throughout system 10, such as at pipes 30A-30D and tanks 20 and 22, to maintain the salt at elevated temperatures. Heating of the salt produces various particles and gases such as chlorides, nitrous oxides ($NO_x$) and water ($H_2O$), that are released into pipes 30A-30D and ultimately to the atmosphere.

Air drying systems 12 are connected to pipes 30A, 30C and 30D, respectively, to condition air entering system 10. Specifically, air drying systems 12 include vent piping 38 and dryers 40 to allow airflow into and out of system 10 and to remove moisture from air flowing into system 10. Typically, the heat transfer medium is routed through pipes 30A-30D at pressures between 100 pounds per square inch (psi) (~689.5 kPa) and 200 psi (~1379.0 kPa) to, for example, transport the heat transfer medium up to receiver 16. Vent piping 38 opens system 10 to atmospheric pressure and permit air to enter system 10 during various operations. Every night, before shutdown, and during certain maintenance operations, the heat transfer medium needs to be drained out of system 10 and vent piping 38 permits atmospheric air to enter system 10 to equalize pressure within system 10 with atmospheric pressure. The introduction of outside air into system 10, however, also introduces gases and particles from the surrounding environment into system 10. The presence of particulate and gaseous byproducts and foreign gases and particles within system 10 can cause corrosion and cracking of pipes 30A-30D. In particular, chlorides released from the salt and found in atmospheric air can react with moisture within system 10 to cause chloride stress corrosion cracking of components of system 10, such as pipes 30A-30D and tanks 20 and 22. Vent piping 38 is, therefore, provided with dryers 40 to remove moisture of outside air entering system 10 thereby reducing the risk of chloride stress corrosion cracking and other damage. In other embodiments, air drying systems can be implemented directly on other heat transfer medium housings, such as storage tanks 20 and 22. Additionally, an air drying system of the present invention may be implemented on receiver 16. Any number of air drying systems may be used as is necessary to properly vent and dry air within system 10.

Figure 2:
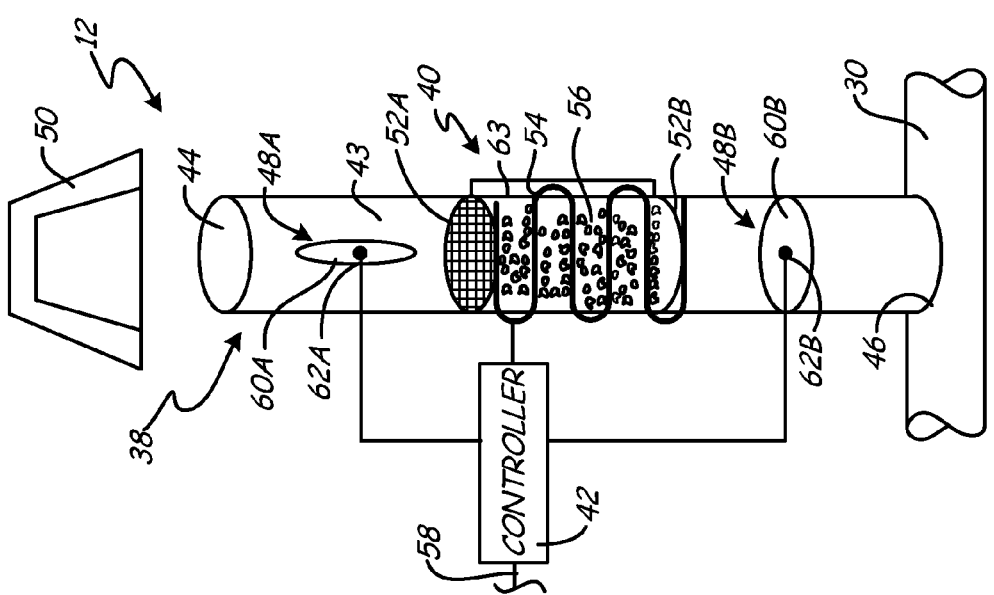
FIG. 2 is a schematic diagram of a first embodiment of a single-pipe, desiccant-based air drying system for use in the concentrated solar power generation system of FIG. 1.

FIG. 2 is a schematic diagram of a first embodiment of air drying system 12, comprising a single-pipe, desiccant-based system, for use in concentrated solar power generation system 10 of FIG. 1. Air drying system 12 is connected to pipe 30, which is representative of any heat transfer fluid pipe used in system 12, such as pipes 30A-30D. Air drying system 12 comprises vent piping 38 and dryer 40, which are connected to controller 42. Vent piping 38 includes main pipe 43, inlet 44, outlet 46, first damper 48A, second damper 48B and shield 50. Dryer 40 includes first screen 52A, second screen 52B, trace heating element 54, and desiccant pack 56. Controller 42 is connected to a system-wide controller (not shown) through communication system 58, such as a wireless or wired computer network, to operate solar power generation system 10. Controller 42 operates dampers 48A and 48B to de-humidify air flowing into pipe 30 using desiccant pack 56 and, using trace heating element 54, to de-humidify desiccant pack 56. In other embodiments, however, dampers 48A and 48B may be operated manually.

Main pipe 43 comprises a tubular structure typically formed from a corrosion resistant material such as stainless steel. Inlet 44 is open to the atmosphere and outlet 46 is connected to pipe 30 so that air from the atmosphere is permitted to flow into pipe 30 where a volume of molten salt is flowing between components of system 10. Shield 50 is positioned over inlet 44 to prevent unwanted contaminants, such as dust, water and other environmental particulates, from entering pipe 30. Shield 50 may comprise a hat or hood positioned above inlet 44, or may be connected directly to inlet 44. In other embodiments, inlet 44 may include a filter or screen. First damper 48A and second damper 48B are disposed within main pipe 43 to control airflow through vent piping 38. Dampers 48A and 48B comprise valves that can be independently operated to close-off flow through pipe 43 and to isolate desiccant pack 56. In one embodiment, dampers 48A and 48B comprise butterfly valves having restrictor plates 60A and 60B disposed on pins 62A and 62B, respectively, extending through pipe 30A. Restrictor plates 60A and 60B are rotated on pins or shafts 62A and 62B, such as with actuators or solenoids activated by controller 42.

Desiccant pack 56 is positioned within main pipe 43 between restrictor plates 60A and 60B using screens 52A and 52B. Screens 52A and 52B are fastened to the interior of main pipe 43 using any conventional method such as with welding or with fasteners. Screens 52A and 52B each comprise a mesh of interwoven wires that provide containment of desiccant pack 56, but that also permit air to pass through. Desiccant pack 56 comprises a bed of hygroscopic material that absorbs moisture from surrounding air. In the embodiment shown, desiccant pack 56 comprises small pieces, such as granules or chunks, that are arranged in a packed bed between screens 52A and 52B within main pipe 43. As such, the spacing of the mesh wires of screens 52A and 52B is sized small enough to prevent granules of the hygroscopic material from passing into pipe 30, but are not so close as to prevent free passage of air through main pipe 43. Likewise, the granules are selected to be small enough to densely fit within main pipe 43, but large enough so that there will be sufficient space between the granules to allow airflow when packed. In other embodiments, desiccant pack 56 may be restrained in any manner that permits airflow through main pipe 43, such as with netting or fabric mesh. Screens 52A and 52B are positioned within main pipe 43 to prevent desiccant pack 56 from interacting with the heat transfer medium, thus avoiding any potential reactions.

The quantity of desiccant within vent piping 38 is determined based on the desired drying capacity of dryer 40, which depends on the expected mass flow of air through vent piping 38, the size of pipe 30, the number of drying systems and vent pipes used in system 10, the desired humidity level of air within pipe 30, local weather and environmental conditions such as humidity, the drying capacity of desiccant pack 56, the size and surface area of the granules, the capacity of trace heating element 54 and other such similar factors. Screens 52A and 52B are sized to support up to several hundred pounds of desiccant pack 56. Any known desiccants or drying agents may be used. In one embodiment, desiccant pack 56 comprises granules of sodium silicate, which is commonly known as silica gel. Sodium silicate granules are porous and have a surface area of about 800 $m^2/g$ (square meters per gram) that enables the granules to absorb about forty percent of their weight in water. Once saturated, sodium silicate can be restored to a useable, de-humidifying state, or regenerated, by heating to approximately between 120° C. (~250° F.) and 150° C. (~300° F.) for about two hours. Desiccant pack 56 is heated by trace heating element 54 to regenerate the hygroscopic material.

Trace heating element 54 provides heat at dryer 40 to recharge desiccant pack 56. Heating element 54 is connected to controller 42 so that heat can be selectively provided to perform drying operations of desiccant pack 56. In the embodiment shown, trace heating element 54 comprises an electric heating coil or resistive heating element that is wound through desiccant pack 56 within main pipe 43. In other embodiments, heating element 54 may be wound around main pipe 43. In other embodiments, desiccant pack 56 may be heated through combustion of propane gas. In yet other embodiments, desiccant pack 56 may be heated through chemical reaction heaters. Trace heating element 54 comprises a localized heat source that elevates the temperature of desiccant pack 56 to levels at which regeneration or drying of desiccant pack 56 will occur.

Controller 42 operates heating element 54 and dampers 48A and 48B to dry air entering pipe 30 through vent piping 38. In an air flow mode, both dampers 48A and 48B are opened to permit air to flow through vent piping 38 and enter pipe 30. In a drying mode, such as is depicted in FIG. 2, damper 48B is closed to prevent air from entering pipe 30A and damper 48A is open to permit water vapor to escape desiccant pack 56. In an operating mode, both dampers 48A and 48B are closed to prevent contaminants, air and moisture from entering pipe 30.

During operation of system 10, molten salt flows through pipe 30 en route between heat transfer medium housings, such as cold storage tank 20 and central receiver 16 (FIG. 1), while dampers 48A and 48B are typically closed. However, it is sometimes necessary to permit air to flow into pipe 30 to equalize pressurize in tank 20 or to drain receiver piping when, for example, tank 20 needs to be emptied for maintenance. As such, controller 42 rotates pins 62A and 62B to position restrictor plates 60A and 60B to permit air to enter vent piping 38. For example, restrictor plates 60A and 60B may be rotated parallel to the direction of main pipe 43. Accordingly, as molten salt leaves cold tank 20 to travel to receiver 16 and hot tank 22 (FIG. 1), vent piping 38 permits air to enter system 10 to prevent a vacuum from forming in cold tank 20. Air is drawn into main pipe 43 and pulled through desiccant pack 56 to reduce the moisture content of the incoming air. As air passes through main pipe 43, moisture from the air is absorbed by the hygroscopic material comprising desiccant pack 56. For example, water content of the air is drawn into surface pores of sodium silicate where the water is stored such that the water is prevented from entering pipe 30A. As such, the water content of the air is reduced to prevent formation of corrosion within pipe 30 and other components of system 10, such as tanks 20 and 22.

Stress corrosion cracking is a common mode of failure in many stainless steels, which are typically used within system 10 to withstand water corrosion and the high salt environment. Stress corrosion cracking, which can form with little or no warning, occurs when a material is subjected to a loading, either from residual stresses or operating stresses, and is exposed to a catalyst, such as chlorides. Chloride stress corrosion cracking causes stainless steels, which are typically tough and ductile, to become brittle and rapidly crack under loading at levels much less than the steels are designed to withstand. In various embodiments of system 10, pipes 30A-30D can be fitted with an air quality instrumentation system, as is described in the related application entitled "AIR INSTRUMENTATION SYSTEM FOR CONCENTRATED SOLAR POWER GENERATION SYSTEMS" by inventors A. Zillmer and J. Carroll, to measure chloride content in the air within pipes 30A-30D. Chloride stress corrosion cracking, however, can be initiated and sustained after only brief exposure to low levels of a chloride catalyst. Thus, chloride stress corrosion cracking is more easily controlled by limiting the moisture within system 10. The present invention reduces the water content within system 10 to prevent reaction with chloride particles to prevent the occurrence of chloride corrosion cracking.

After the maintenance operation is completed and the molten salt is returned to tank 20, dampers 48A and 48B are adjusted by controller 42 to prevent air from entering pipe 30 and to recharge desiccant pack 56. Damper 48B is rotated so as to be perpendicular to the direction of main pipe 43, and damper 48B is rotated to be parallel to main pipe 43. Trace heating element 54 is activated by controller 42 to heat desiccant pack 56 to temperatures that will cause water vapor accumulated by the hygroscopic material to evaporate. Damper 48B is closed to prevent the water vapor and other atmospheric air from entering pipe 30, while damper 48A is opened to permit the water vapor to exit to the atmosphere. In other embodiments, damper 48A may be left closed during drying of desiccant pack 56, but is opened after drying to permit the water vapor to escape. After desiccant pack 56 is dried, damper 48A is closed to prevent further saturation or humidification of desiccant pack 56. Desiccant pack 56 may also become saturated before a maintenance operation is completed such that drying operations need to be taken before switching modes. As such, desiccant pack 56 can be provided with an indicator to give a visual warning of the condition of desiccant pack 56. For example, a color additive may be included with desiccant pack 56 that changes color with humidity levels. The additive and desiccant pack 56 can be inspected through window 63 provided in main pipe 43 either manually at the site of desiccant pack 56 or over a network camera aimed at desiccant pack 56 through window 63. In other embodiments, the capacity and saturation of desiccant pack 56 can be estimated based on theoretical factors such as humidity of the atmospheric air and the amount of time activated using controller 42.

Figure 3:
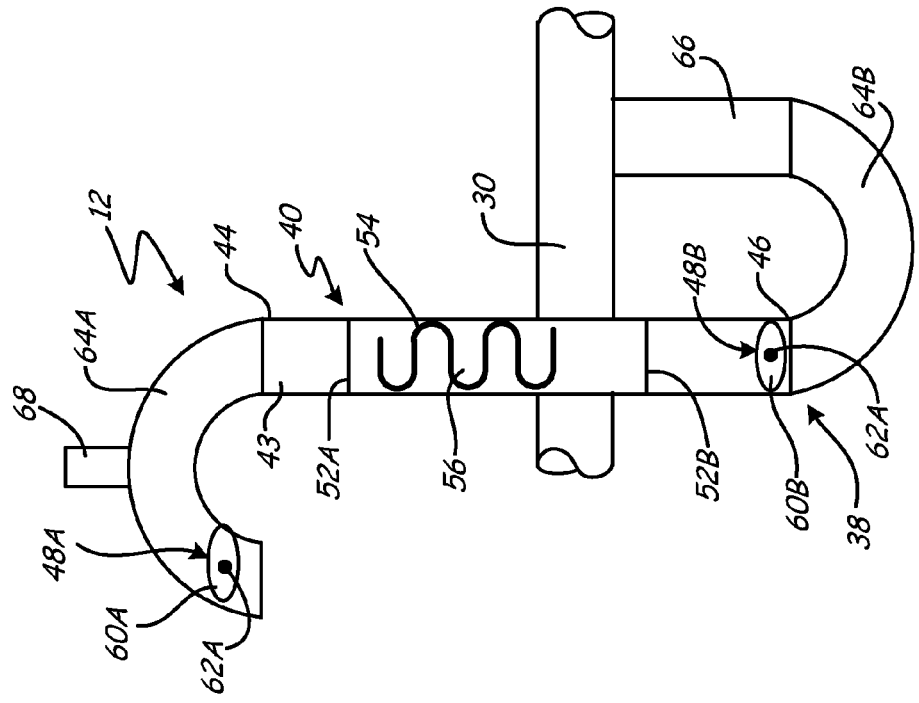
FIG. 3 is a schematic diagram of a second embodiment of a single-pipe, desiccant-based air drying system for use in the concentrated solar power generation system of FIG. 1.

FIG. 3 is a schematic diagram of a second embodiment of air drying system 12, comprising a single-pipe, desiccant-based system, for use in concentrated solar power generation system 10 of FIG. 1. Air drying system 12 is connected to pipe 30, which is representative of any heat transfer fluid pipe used in system 12, such as pipes 30A-30D. Air drying system 12 includes components similar to that of the system described with respect to FIG. 2 and similar components include like numbering. Air drying system 12 comprises vent piping 38 and air dryer 40, both of which can be connected to a controller similar to that of controller 42 of FIG. 2. Vent piping 38 includes main pipe 43, inlet 44, outlet 46, first damper 48A, second damper 48B, top elbow joint 64A, bottom elbow joint 64B, extension pipe 66 and vent valve 68. Dryer 40 includes first screen 52A, second screen 52B, trace heating element 54, and desiccant pack 56, which perform in a manner consistent with what was described with respect to FIG. 2. Main pipe 43 is, however, connected to pipe 30 using elbow joints 64A and 64B and extension pipe 66 to achieve additional benefits.

Inlet 44 of main pipe 43 is connected to top elbow joint 64A and outlet 46 of main pipe 43 is connected to bottom elbow joint 64B. Bottom elbow joint 64B is connected to pipe extension 66, which is connected to pipe 30. Pipe extension 66 connects to an underside or bottom portion of pipe 30 such that pipe 30 is not opened to direct deposits of weather, such as rain, or dust. Pipe extension 66 extends downward to position the opening into pipe 30 below pipe 30. A first end of elbow joint 64B extends from pipe extension 66 and directs the opening into pipe 30 toward an upward direction. Outlet 46 of main pipe 43 connects to a second end of elbow joint 64B such that main pipe 43 extends vertically, as in the configuration of FIG. 2. Elbow joint 64B thus routes air entering into pipe 30 through a one hundred eighty degree turn and acts as sump to catch debris or particles entering vent piping 38. Elbow joint 64A connects to inlet 44 of main pipe 43 and again redirects the opening into pipe 30 to a downward direction. Thus, elbow joint 64A routes air entering vent piping 38 through a one hundred eighty degree turn and acts as a guard to prevent rain or other debris from entering pipe 30 without the need for a separate shield. Desiccant pack 56 and trace heating element 54 operate in a similar manner as to what is described with respect to FIG. 2 to dehydrate atmospheric air entering vent piping 38 and then to regenerate desiccant pack 56. Elbow joint 64A also includes vent valve 68, which permits humidity to escape from vent piping 38. Any suitable valve may be used. The valves may be actively controlled with controller 42 and actuators, or may be manually operated to vent humidity from vent piping 38 during dehydration of desiccant pack 56.

Figure 4:
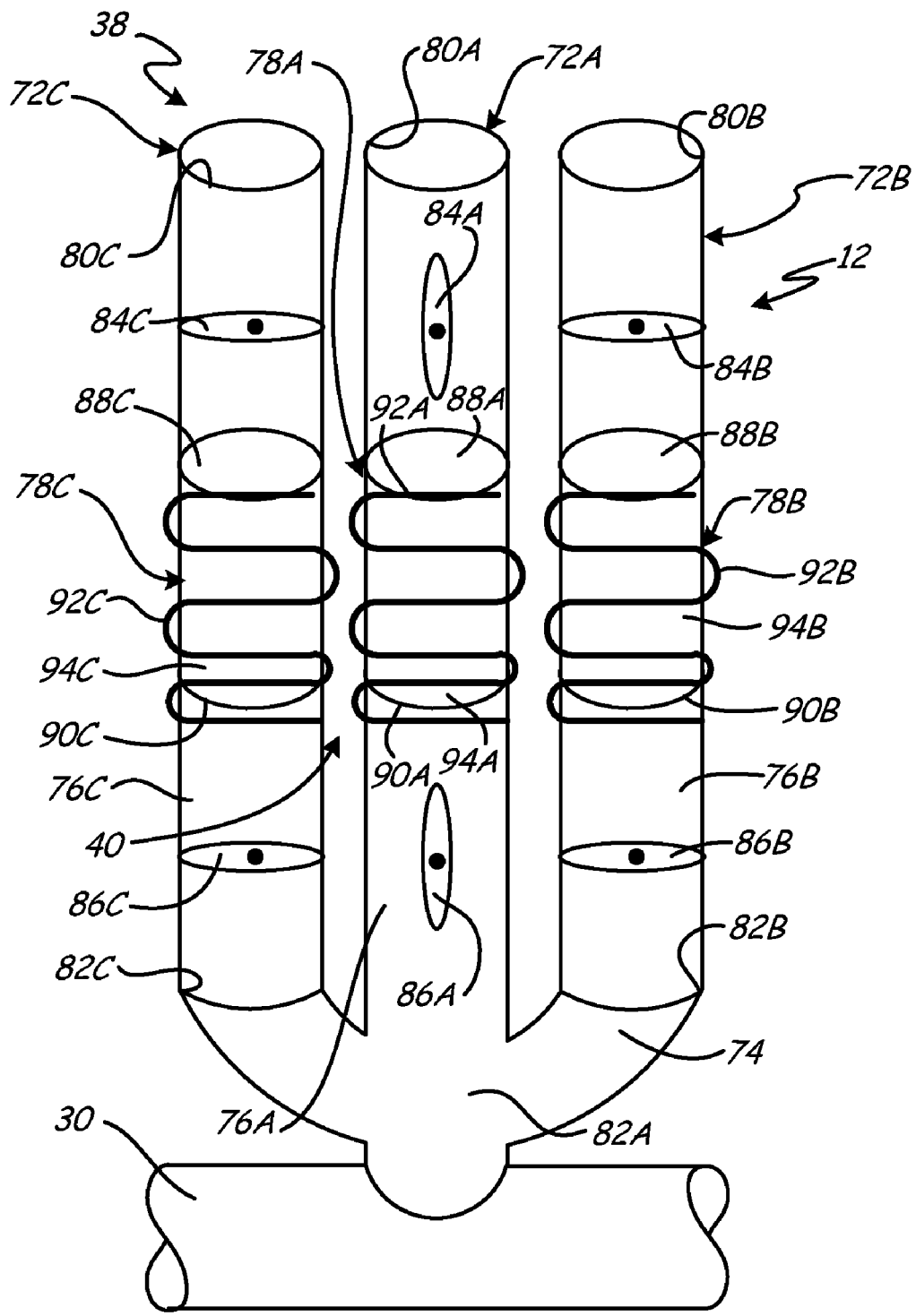
FIG. 4 is a schematic diagram of a first embodiment of a multi-pipe, desiccant-based air drying system for use in the concentrated solar power generation system of FIG. 1.

FIG. 4 is a schematic diagram of a third embodiment of air drying system 12, comprising a multi-pipe, desiccant-based system, for use in concentrated solar power generation system 10 of FIG. 1. Air drying system 12 is connected to pipe 30, which is representative of any heat transfer fluid pipe used in system 12, such as pipes 30A-30D. Air drying system 12 comprises vent piping 38 and air dryer 40, both of which can be connected to a controller similar to that of controller 42 of FIG. 2. Vent piping 38 includes multiple pipes connected by manifold 40, each of which is outfitted with a desiccant pack such that air dryer 40 comprises multiple desiccant packs. As such, three air drying systems 72A-72C are connected to pipe 30 through manifold 74. First air drying system 72A includes vent pipe 76A and dryer 78A. Second air drying system 72B includes vent pipe 76B and dryer 78B. Third air drying system 72C includes vent pipe 76C and dryer 78C. As such, dryer 40 comprises dryers 78A-78C and piping 38 comprises vent pipes 76A-76C. Vent pipes 76A-76C include, respectively, inlets 80A-80C, outlets 82A-82C, dampers 84A-84C and dampers 86A-86C. Dryers 78A-78C include, respectively, screens 88A-88C and screens 90A-90C, between which are located trace heating elements 92A-92C and desiccant packs 94A-94C.

Outlet 82A of vent pipe 76A is connected to pipe 30 while inlet 80A is open to ambient air. Vent manifold 74 connects to a lower portion of vent pipe 76A between outlet 82A and damper 86A. Vent manifold 74 comprises a tubular elbow joint that extends through vent pipe 76A. Outlets 82B and 82C of vent pipes 76B and 76C are connected to end openings of vent manifold 74 such that a continuous airflow path is formed between inlet 80B and inlet 80C. Vent manifold 74 also includes mid-span openings such that the interior of vent manifold 74 opens to the interior of vent pipe 76A. As such, ambient air entering vent pipe 76A is able to pass through manifold 74 and into pipe 30. Additionally, air entering vent pipes 76B and 76C is able to pass through manifold 74 and into pipe 30 through outlet 82A of vent pipe 76A. Thus, ambient air entering inlets 80A-80C is funneled into pipe 30 through outlet 82A at a single opening such that pipe 30 includes only a single opening. Dampers 80A-82C, however, control airflow such that vent pipes 76A-76C can perform different operations.

Air drying systems 72A, 72B and 72C are configured to individually operate in the same manner as air drying system 12 of FIG. 2. However, collective operation of air drying systems 72A, 72B and 72C is orchestrated by a controller (not shown) similar to that of controller 42 of FIG. 2. Evacuation of some solar power generation systems requires large quantities of ambient air, beyond the capability of a single dryer. The controller operates one of air drying systems 72A, 72B and 72C to dehumidify ambient air entering pipe 30 while the other two are either in standby or regenerating modes such that large quantities of ambient air can be dehydrated. For example, as shown in FIG. 4, dampers 84A and 86A of vent pipe 76A are opened, and dampers 84B, 84C, 86B and 86C of vent pipes 76B and 76C are closed. Ambient air is permitted to travel through vent pipe 76A to enter pipe 30, such as is needed during an evacuation of the heat transfer medium from system 10. The ambient air is drawn through desiccant pack 94A to remove moisture from the ambient air as it enters system 10 in order to prevent the occurrence of corrosion. Ambient air is prevented from entering vent pipes 76B and 76C such that desiccant packs 94B and 94C can be prepared to for dehumidifying ambient air when desiccant pack 94A becomes saturated. For example, desiccant pack 94B can be dehydrated and in a standby mode ready to use immediately after desiccant pack 94A becomes ineffective or saturated. Desiccant pack 94C can be undergoing a dehydration process by being heated by trace heating element 92C. Thus, air drying system 70 permits a continuous stream of air entering pipe 30 to dried.

Although the present invention has been described with reference to preferred embodiments, workers skilled in the art will recognize that changes may be made in form and detail without departing from the spirit and scope of the invention.

The invention claimed is:

1. An air drying system for use in a concentrated solar power generation system using a molten salt heat transfer medium, the air drying system comprising:
   a first vent pipe extending from a pipe containing the molten salt heat transfer medium of the concentrated solar power generation system, the first vent pipe having:
   a first inlet open to atmospheric air; and
   a first outlet open to an interior of the solar power generation system in fluid communication with the molten salt heat transfer medium; and
   a first desiccant pack positioned within the first vent pipe between the first inlet and first outlet, the first desiccant pack being positioned to reduce moisture content of ambient air flowing into the first vent pipe.

2. The air drying system of claim 1 and further comprising:
a first damper positioned between the first inlet and the first desiccant pack; and
a second damper positioned between the first outlet and the first desiccant pack;
wherein the first and second dampers are configured to selectively close off and open airflow through the first vent pipe.

3. The air drying system of claim 2 wherein the first and second dampers comprise butterfly valves.

4. The air drying system of claim 2 and further comprising a first trace heating system configured to regenerate the first desiccant pack by elevating the temperature of the first desiccant pack to evaporate water content within the first desiccant pack.

5. The air drying system of claim 4 and further comprising a shield for preventing entrance of foreign matter into the first inlet.

6. The air drying system of claim 4 wherein the first vent pipe includes an elbow for preventing entrance of foreign matter into the solar power generation system.

7. The air drying system of claim 6 and further comprising a vent valve positioned at the elbow to permit exit of moisture from the first vent pipe.

8. The air drying system of claim 4 wherein the first desiccant pack is supported within the first vent pipe using a screen or net.

9. The air drying system of claim 8 wherein the first desiccant pack is distributed across a cross section of the first vent pipe such that ambient air traveling through the first vent pipe passes through the first desiccant pack.

10. The air drying system of claim 4 and further comprising a controller to selectively operate the first and second dampers and the first trace heating system to regenerate the first desiccant pack, to vent humidity to the ambient air, and to prevent humidity from entering the solar power generation system through the first vent pipe.

11. The air drying system of claim 1 wherein the heat transfer medium comprises a molten salt and the first desiccant pack comprises a silica gel, wherein the molten salt interacts with stainless steel components of the solar power generation system and not with the silica gel.

12. The air drying system of claim 1 and further comprising:
a window positioned within the first vent pipe positioned adjacent the first desiccant pack; and
a humidity-sensitive color additive mixed with the first desiccant pack to indicate moisture content of the first desiccant pack.

13. The air drying system of claim 1 and further comprising:
a second vent pipe comprising:
a second inlet open to ambient air; and
a second outlet open to the concentrated solar power generation system;
a second desiccant pack positioned within the second vent pipe between the second inlet and the second outlet;
a third damper positioned between the second inlet and the second desiccant pack; and
a fourth damper positioned between the second outlet and the second desiccant pack;
wherein the controller selectively operates the third and fourth dampers and the second heating system to regenerate the second desiccant pack, to vent humidity to the ambient air, and to prevent humidity from entering the solar power generation system through the second vent pipe.

14. The air drying system of claim 13 and further comprising a manifold connecting the second outlet with the first vent pipe between the first outlet and the second damper such that the first vent pipe and the second vent pipe are connected to the solar power generation system through a common opening.

15. The air drying system of claim 14 wherein the controller selectively operates the first, second, third and fourth dampers, and the first and second trace heating elements such that while either the first vent pipe or the second vent pipe is open to ambient air flow, the other vent pipe is closed to ambient air flow to permit drying of a desiccant pack.

16. A solar power generation system comprising:
a fluid housing;
a heat transfer fluid within the fluid housing;
a solar collector for concentrating solar energy onto the heat transfer fluid;
a heat exchanger connected to the fluid housing to receive thermal energy from the heat transfer fluid;
a conversion system connected to the heat exchanger to convert the thermal energy to electrical power; and
an air drying system connected to the fluid housing, the air drying system comprising:
a first vent pipe extending from the fluid housing, the first vent pipe having an first inlet open to ambient air and a first outlet open to an interior of the fluid housing in fluid communication with the heat transfer medium;
a first desiccant pack positioned within the first vent pipe to absorb moisture from ambient air flowing into the fluid housing;
a first damper system positioned within the first vent pipe to control airflow through the first vent pipe;
a first heating system in thermal communication with the first desiccant pack to evaporate moisture absorbed by the first desiccant pack; and
a controller to operate the first damper system and the first heating system.

17. The solar power generation system of claim 16 and further comprising:
a screen extending through an interior of the first vent pipe to support the first desiccant pack;
wherein the first desiccant pack comprises a bed of silica gel granules dispersed over the screen such that ambient air traveling through the first vent pipe passes through the first desiccant pack.

18. The solar power generation system of claim 17 and further comprising:
a central receiver; and
a plurality of heat transfer medium pipes connected to the housing;
wherein the heat transfer fluid comprises a molten salt and the solar collector comprises an array of heliostats arranged around the central receiver.

19. The solar power generation system of claim 16 and further comprising:
a manifold connected to the first vent pipe;
a second vent pipe connected to the manifold;
a second desiccant pack positioned within the second vent pipe to absorb moisture from ambient air flowing into the fluid housing;
a second damper system positioned within the second vent pipe to control airflow through the second vent pipe; and
a second heating system in thermal communication with the second desiccant pack to evaporate moisture absorbed by the second desiccant pack.

20. A method for drying air in a solar power generation system, the method comprising:
- flowing a heat transfer medium through fluid piping;
- heating the heat transfer medium within the fluid piping using solar energy;
- transferring thermal energy from the heat transfer medium to a heat exchanger;
- converting thermal energy from the heat exchanger to electrical energy;
- venting the fluid piping to ambient air to draw air into the fluid piping with a vent pipe;
- drying the ambient air with a desiccant pack in the vent pipe to draw moisture away from the ambient air as the ambient air enters the fluid piping; and
- recharging the desiccant pack with heat such that drying of the ambient air can be repeated.

* * * * *